Patented Aug. 22, 1939

2,170,650

UNITED STATES PATENT OFFICE 2,170,650

ALLOY

George M. Bouton, Lynbrook, N. Y., and Earle E. Schumacher, Maplewood, N. J., assignors to Bell Telephone Laboratories, Incorporated, New York, N. Y., a corporation of New York No Drawing. Application September 2, 1936,
Serial No. 99,090

4 Claims. (Cl. 75—167)

This invention relates to lead alloys and more particularly to a lead alloy specially suitable for use in the plates or grids of storage batteries.

Storage batteries sulphate and as a consequence lose their charge either in the course of normal operation or as the result of standing for some time on open circuit. In the first case a conversion of the sponge lead of the negative plates and the lead dioxide (frequently called lead peroxide) of the positive plates to lead sulphate is an essential reaction and results in the generation of usable electrical energy. In the second case the formation of lead sulphate serves no useful purpose, the electric energy generated being dissipated and the battery slowly discharging. Repeated sulphation of this latter character, which has been considered more or less of a necessary evil, materially decreases the life and efficiency of the battery.

In the manufacture of storage battery plates or grids lead-antimony alloys have been almost universally employed, an alloy containing 9% antimony being the one most generally used. It has been found with such alloys that in the course of the normal operation of the battery antimony is leached out of the positive plate, passes through the solution, deposits on the negative plate and there produces local action and self-discharge. This leaching out of the antimony from the alloy at the positive plate greatly weakens the plate and eventually results in structural failure. Furthermore, the antimony present in the alloy of the negative plate also is responsible for self-discharge, although to a lesser degree than the antimony plated over to the negative plate from the positive plate. It is a well-known fact that antimony diffuses through lead at an appreciable rate, thus continually presenting antimony at the surface of the plate in contact with the electrolyte. Antimonial lead is employed in storage battery construction because of its metallurgical and physical properties and not as the result of the consideration of its suitability from the electrochemical standpoint. From the latter standpoint only metals should be used with lead which are electronegative to lead, that is, less noble than lead. Furthermore, the added metal or metals should show little or no tendency towards diffusion and segregation.

In Patent 2,042,840 granted to Horace E. Haring under date of June 2, 1936, there is disclosed a storage battery electrode composed of an age-hardened lead-calcium alloy containing not more than 1% calcium, which has been found to have electrical properties far superior to the lead-antimony storage battery alloys in common use. The present invention is directed to an improved alloy which when used in storage battery plates provides a similar improvement in electrical characteristics and a still greater improvement in physical characteristics.

It is therefore an object of the invention to provide an improved alloy for use particularly in storage battery construction which will cause an increase in efficiency of operation and increased life and, moreover, which can be manufactured economically.

To obtain this object and in accordance with the features of the invention, an alloy is provided which consists of substantially pure lead alloyed with two or more metals of the alkaline earth group which are electronegative to lead and which are present in a total amount not to exceed 1%. In accordance with the invention there is added to an alloy of lead and not more than 1% calcium, a small amount of one or more other alkaline earth metals. An alloy having greater improved mechanical properties is brought about by adding a small amount of barium to the lead-calcium alloy. The further addition of a small amount of strontium increases the tensile strength of the alloy and also improves its casting properties. Furthermore, since barium and strontium, like calcium, are electronegative to lead, these alloys may be employed in storage batteries without a sacrifice in electrical properties.

As the result of extensive tests it has been found that a ternary alloy consisting of calcium .01 to .15%, barium .005 to .05% and the balance substantially pure lead is a satisfactory alloy for use in storage battery plates. The preferred composition of this alloy is calcium .1%, barium .02% and the balance lead.

A still further improvement in tensile strength is obtained by adding to a ternary alloy having the above variations in composition, strontium in an amount from .005 to .2%. In the preferred alloy the strontium content is .06%, the other metals being present in the same proportion as in the preferred ternary alloy.

In preparing these alloys a lead of high purity is first melted and the surface covered with lamp black preparatory to the introduction of the addition alloys consisting of lead and higher percentages of the other metals to be added. This reducing cover of carbon decreases the loss of the highly oxidable metals to a marked degree. The addition alloys are then introduced in the correct amounts to produce the desired alloy and the alloy caused to solidify being cooled from an elevated temperature at a sufficiently rapid rate to cause some of the solute constituents to remain in the lead in the form of a supersaturated solid solution, after which the alloy is caused to assume a more stable state by aging. As the result of this process there is produced an alloy consisting of a matrix of lead or lead solid solution throughout which a large number of minute particles containing the additional metals are substantially uniformly dispersed. When employing these alloys for storage battery grids it has been found satisfactory to use casting temperatures of from 400 to 475 degrees C. and to rely upon air quenching. For other purposes where large parts are cast or formed, it may be found desirable to resort to water or other quenching to bring about the desired dispersion.

In the aging of these alloys it is important that the temperature be maintained sufficiently low so that there results little agglomeration of the finely dispersed particles and it has been found that satisfactory results are obtained when the alloys are aged at a temperature not higher than 150 degrees C. An aging treatment for these alloys which has been found satisfactory consists in aging seven days at room temperature and then heat treating for one day at a temperature of approximately 100 degrees C.

The alloys when thus treated show tensile strengths superior to the lead-antimony alloys commonly used in storage battery manufacture and furthermore are much superior in their electrical properties due to the fact that the additional metals are all electronegative to lead. The tensile strengths of these alloys compared with the lead-antimony alloys commonly used in storage battery manufacture, as well as the lead-calcium alloy referred to, are as follows:

| Composition | Tensile strength (pounds per square inch) |
| --- | --- |
| Antimony 12%, balance lead | 7,720 |
| Antimony 9%, balance lead | 8,100 |
| Calcium .1%, balance lead | 8,230 |
| Calcium .1%, barium .02%, balance lead | 9,650 |
| Calcium .1%, barium .02%, strontium .06%, balance lead | 10,700 |

In addition to this improvement in tensile strength these alloys are free from corrosion embrittlement and hot shortness and furthermore they possess good casting qualities. Because of these qualities coupled with their electrical properties, the alloys of this invention are particularly suitable for use in storage battery construction and the added strength permits a reduction of the quantity of metal used. This in turn results in an initial cost saving and also is of advantage where usage requires minimum weight, such as for aeronautical or submarine purposes. Not only in storage batteries but in other fields these alloys can be used to advantage because of their superior physical characteristics.

What is claimed is:

1. An alloy for storage battery electrodes consisting of .01 to .15% calcium, .005 to .05% barium and the balance lead.

2. An alloy for storage battery electrodes consisting of .1% calcium, .02% barium and the balance lead.

3. An alloy for storage battery electrodes consisting of .01 to .15% calcium, .005 to .05% barium, .005 to .2% strontium and the balance lead.

4. An alloy for storage battery electrodes consisting of .1% calcium, .02% barium, .06% strontium and the balance lead.

GEORGE M. BOUTON.
EARLE E. SCHUMACHER.